(12) United States Patent
Sanchez Rola et al.

(10) Patent No.: US 12,556,617 B1
(45) Date of Patent: *Feb. 17, 2026

(54) ASSIGNING PRIVACY RATINGS TO TRACKING DOMAINS IN ORDER TO INCREASE USER AWARENESS OF ONLINE PRIVACY VIOLATIONS

(71) Applicant: Gen Digital Inc., Tempe, AZ (US)

(72) Inventors: Iskander Sanchez Rola, Antibes (FR); Leylya Yumer, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 218 days.

This patent is subject to a terminal disclaimer.

(21) Appl. No.: 18/502,618

(22) Filed: Nov. 6, 2023

Related U.S. Application Data

(63) Continuation of application No. 17/404,494, filed on Aug. 17, 2021, now Pat. No. 11,849,002.

(51) Int. Cl.
| | |
|---|---|
| *H04L 29/00* | (2006.01) |
| *H04L 9/40* | (2022.01) |
| *H04L 67/306* | (2022.01) |
| *H04L 67/55* | (2022.01) |

(52) U.S. Cl.
CPC .......... *H04L 67/55* (2022.05); *H04L 63/1433* (2013.01); *H04L 63/20* (2013.01); *H04L 67/306* (2013.01)

(58) Field of Classification Search
CPC ..... H04L 67/55; H04L 63/1433; H04L 63/20; H04L 67/306
See application file for complete search history.

(56) References Cited

U.S. PATENT DOCUMENTS

| | | | |
|---|---|---|---|
| 11,301,568 B1 * | 4/2022 | Dargude | G06F 3/0647 |
| 11,354,440 B1 * | 6/2022 | Sanchez | G06F 11/3636 |
| 11,381,596 B1 * | 7/2022 | Sanchez | H04L 63/1475 |
| 11,849,002 B1 * | 12/2023 | Sanchez Rola | H04L 63/1433 |
| 2011/0154446 A1 * | 6/2011 | Drozt | H04L 65/4061 726/4 |
| 2016/0099963 A1 * | 4/2016 | Mahaffey | H04L 63/166 726/25 |
| 2017/0357982 A1 * | 12/2017 | Barday | G06Q 10/06 |
| 2018/0341782 A1 * | 11/2018 | Barday | H04L 63/04 |
| 2020/0134211 A1 * | 4/2020 | Miller | H04W 12/02 |
| 2020/0201962 A1 * | 6/2020 | Brannon | G06F 11/3438 |
| 2020/0201963 A1 * | 6/2020 | Brannon | G06F 21/6245 |
| 2021/0029171 A1 * | 1/2021 | Barday | H04L 63/0414 |
| 2021/0344720 A1 * | 11/2021 | Barday | H04L 63/04 |

(Continued)

*Primary Examiner* — Don G Zhao
(74) *Attorney, Agent, or Firm* — MASCHOFF BRENNAN

(57) ABSTRACT

Assigning privacy ratings to tracking domains in order to increase user awareness of online privacy violations. A list of known tracking domains and raw data from a set of host websites may be received. A prevalence, frequency, and role for each tracking domain may be determined from the raw data. Each tracking domain may be assigned to a prevalence cluster, a frequency cluster, and a role cluster. A rank may be determined for each prevalence cluster, frequency cluster, and role cluster. A domain privacy rating may be assigned to each tracking domain that is based on the ranks of the clusters to which each tracking domain is assigned. A privacy action may be performed based on the domain privacy rating assigned to each tracking domain.

17 Claims, 7 Drawing Sheets

(56) References Cited

U.S. PATENT DOCUMENTS

| | | | | |
|---|---|---|---|---|
| 2021/0409382 A1* | 12/2021 | Maslen | .................... | G06N 5/04 |
| 2022/0036389 A1* | 2/2022 | Brannon | ............. | G06F 21/6245 |
| 2022/0092495 A1* | 3/2022 | Brannon | ............. | G06F 21/6245 |
| 2022/0309416 A1* | 9/2022 | Barday | ................ | G06Q 10/067 |
| 2022/0374546 A1* | 11/2022 | Wang | ..................... | G06Q 30/08 |
| 2024/0427900 A1* | 12/2024 | Aloraini | ................ | G06F 21/577 |

* cited by examiner

ASSIGNING PRIVACY RATINGS TO TRACKING DOMAINS IN ORDER TO INCREASE USER AWARENESS OF ONLINE PRIVACY VIOLATIONS

CROSS REFERENCE TO RELATED APPLICATION

This application is a continuation of U.S. patent application Ser. No. 17/404,494 filed on Aug. 17, 2021, which application is incorporated herein by reference in its entirety.

BACKGROUND

Many websites that are accessible on the Internet today host content that is provided by one or more third-party domains. These third-party domains may include tracking domains. These tracking domains can compromise the privacy of any user that happens to visit these host websites or select (e.g., click on or tap on) a link associated with the tracking domain. Tracking domains may appear on host websites in a wide variety of forms. Some tracking domains load content into banners while other tracking domains load content that is embedded directly within the web page itself.

Unfortunately, many Internet users do not recognize tracking domains on host websites and are therefore unaware of the privacy violations that these tracking domains commit. To the extent that users are aware of the privacy violations, many do not take the actions necessary to protect themselves against the tracking domains that commit these violations.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for assigning privacy ratings to tracking domains in order to increase user awareness of online privacy violations may be performed, at least in part, by a computing device including one or more processors. The method may include receiving a list of known tracking domains that load content on one or more host websites within a set of host websites, receiving raw data from the set of host websites, the raw data including information relating to how each tracking domain on the list of known tracking domains behaves on each host website within the set of host websites, determining, from the raw data, a prevalence for each tracking domain by identifying a number of host websites within the set of host websites that load content from each tracking domain, determining, from the raw data, a frequency for each tracking domain by identifying a percentage of host websites, within the number of host websites that load content from each tracking domain, on which each tracking domain performs a tracking activity, determining, from the raw data, a role for each tracking domain by identifying a type of tracking activity that each tracking domain performs on each host website within the set of host websites, assigning each tracking domain to one of a specified number of prevalence clusters, wherein each tracking domain is assigned to a prevalence cluster based on its determined prevalence, assigning each tracking domain to one of a specified number of frequency clusters, wherein each tracking domain is assigned to a frequency cluster based on its determined frequency, assigning each tracking domain to one of a specified number of role clusters, wherein each tracking domain is assigned to a role cluster based on its determined role, determining a prevalence rank for each prevalence cluster in the specified number of prevalence clusters, determining a frequency rank for each frequency cluster in the specified number of frequency clusters, determining a role rank for each role cluster in the specified number of role clusters, assigning a domain privacy rating to each tracking domain within the list of known tracking domains, wherein the domain privacy rating is based on the prevalence rank of the prevalence cluster to which each tracking domain is assigned, the frequency rank of the frequency cluster to which each tracking domain is assigned, and the role rank of the role cluster to which each tracking domain is assigned, and performing a privacy action based on the domain privacy rating assigned to each tracking domain.

In some embodiments, the privacy action may be displaying, on the one or more host websites that load content from each tracking domain, the domain privacy rating for each tracking domain. In these embodiments, the domain privacy rating may be represented by a numerical value or a color. In some embodiments, the privacy action may be blocking content loaded by external domains that have a domain privacy rating above a specified threshold. In some embodiments, the raw data is generated by performing a crawling operation on a number of the most commonly visited websites. In some embodiments, the type of tracking activity that each tracking domain performs on each host website includes at least one of a ghost creator, a third-party creator, an intermediate creator, an own sender, an in-chain sender, an off-chain sender, an own receiver, an own self-receiver, an in-chain receiver, an in-chain self-receiver, an off-chain receiver, an off-chain self-receiver, or an intermediate sharer.

In some embodiments, the specified number of prevalence clusters may be ten, the specified number of frequency clusters may be ten, and the specified number of role clusters may be ten. In these embodiments, a k-means method of vector quantization may be used to create the prevalence, frequency, and role clusters. In some embodiments, a group of prevalence outliers may be identified and a subset of tracking domains within the group of prevalence outliers may be assigned to a first prevalence cluster. In these embodiments, a median absolute deviation may be used to identify the prevalence outliers and a k-means method of vector quantization may be used to cluster a remaining set of tracking domains into nine additional prevalence clusters.

In some embodiments, the prevalence rank may organize each prevalence cluster into a sequence from a lowest privacy invasive prevalence cluster at one end to a highest privacy invasive prevalence cluster at an opposite end, the frequency rank may organize each frequency cluster into a sequence from a lowest privacy invasive frequency cluster at one end to a highest privacy invasive frequency cluster at an opposite end, and the role rank may organize each role cluster into a sequence from a lowest privacy invasive role cluster at one end to a highest privacy invasive role cluster at an opposite end.

In some embodiments, to determine the prevalence rank, a centroid of each prevalence cluster may be identified and the sequence of prevalence clusters may be based on the number of host websites, at the centroid of each prevalence cluster, that load content from each tracking domain, to determine the frequency rank, a centroid of each frequency cluster may be identified and the sequence of frequency clusters may be based on the percentage of host websites, at the centroid of each frequency cluster, on which each tracking domain performs a tracking activity, and to determine the role rank, a centroid of each role cluster may be identified and the type of tracking activity that each tracking domain performs on each host website at the centroid of each role cluster may be evaluated to determine the sequence of role clusters from the lowest privacy invasive role cluster to the highest privacy invasive role cluster. In these embodiments, the prevalence rank, the frequency rank, and the role rank may be identified by numerical values and the domain privacy rating assigned to each tracking domain may be a sum of their respective ranks.

In some embodiments, the method may further include identifying a new tracking domain that loads content on one or more host websites within the set of host websites, wherein the new tracking domain is not on the list of known tracking domains, determining, from the raw data, a prevalence for the new tracking domain by identifying a number of host websites within the set of host websites that load content from the new tracking domain, determining, from the raw data, a frequency for the new tracking domain by identifying a percentage of host websites within the number of host websites that load content from each tracking domain on which the new tracking domain performs a tracking activity, determining, from the raw data, a role for the new tracking domain by identifying a type of tracking activity that that the new tracking domain performs on each host website within the set of host websites, assigning the new tracking domain to one of the specified number of prevalence clusters based on its determined prevalence, assigning the new tracking domain to one of the specified number of frequency clusters based on its determined frequency, assigning the new tracking domain to one of the specified number of role clusters based on its determined role, assigning a new domain privacy rating to the new tracking domain, wherein the new domain privacy rating is based on the prevalence rank of the prevalence cluster to which the new tracking domain is assigned, the frequency rank of the frequency cluster to which the new tracking domain is assigned, and the role rank of the role cluster to which the new tracking domain is assigned, and performing a privacy action based on the new domain privacy rating assigned to the new tracking domain. In these embodiments, the privacy action may be displaying, on the one or more host websites that load content from the new tracking domain, the new domain privacy rating for the new tracking domain.

In some embodiments, the method may further include assigning each host website to one of a specified number of website clusters, wherein each host website is assigned to a website cluster based on the domain privacy ratings of the tracking domains that load content on each host website, determining a rank for each website cluster in the specified number of website clusters, assigning a website privacy rating to each host website within the set of host websites, wherein the website privacy rating is based on the rank of the website cluster to which each host website is assigned, and performing a privacy action based on the website privacy rating assigned to each host website.

In some embodiments the privacy action may be displaying the website privacy rating on each host website. In these embodiments, the website privacy rating may be represented by a numerical value or a color. In some embodiments, the privacy action may be blocking the host websites that have a website privacy rating above a specified threshold. In some embodiments, a k-means method of vector quantization may be used to create the website clusters. In some embodiments, the rank for each website cluster in the specified number of website clusters may organize each website cluster into a sequence from a lowest privacy invasive website cluster at one end to a highest privacy invasive website cluster at an opposite end.

In some embodiments, the method may further include identifying a new host website that loads content from one or more tracking domains within the list of known tracking domains, wherein the new host website is not in the set of host websites, assigning the new host website to one of the specified number of website clusters, wherein the new host website is assigned to a website cluster based on the domain privacy ratings of the tracking domains that load content on the new host website, assigning a new website privacy rating to the new host website, wherein the new website privacy rating is based on the rank of the website cluster to which the new host website is assigned, and performing a privacy action based on the new website privacy rating assigned to the new host website.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
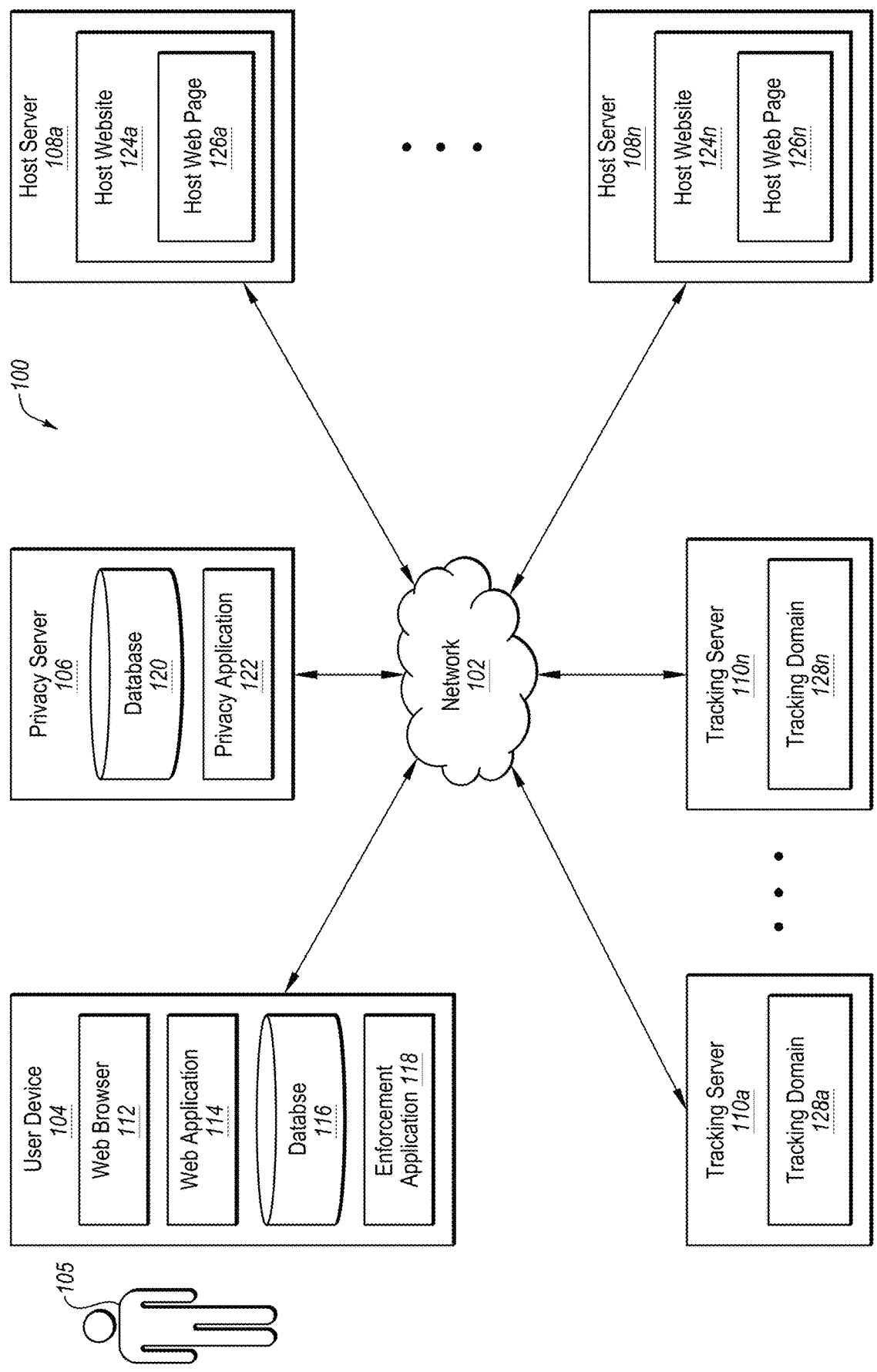
FIG. 1 illustrates an example system configured for assigning privacy ratings to tracking domains in order to increase user awareness of online privacy violations.

A large number of websites host content that is provided by third-party domains. These third-party domains may appear in banners on the host website, such as advertisements, or these third-party domains may load content that is imbedded directly within the host website itself. These third-party domains may include tracking domains, which perform tracking activities through the use of cookies, or strings of text loaded onto a user's web browser when a user visits a website that loads content from a tracking domain.

Tracking domains can compromise the privacy of users that visit these host websites. For example a cookie may provide the host website with information to recognize and remember users, and may include the ability to track a variety of data, such as each user's search engine queries, the websites that a user visits, the frequency of a user's return visits to a website, the speed a user scrolls through a web page, where the user stops scrolling within a web page, movement of a mouse cursor within a web page, user comments, user clicks, user entries in forms, how long a user stays a specific location or at a specific website or web page, etc.

Unfortunately, many Internet users do not recognize the presence of tracking domains on host websites and are therefore unaware of the privacy violations that these tracking domains commit. To the extent that users are aware of the privacy violations, many do not take the actions necessary to protect themselves against the tracking domains that commit these violations.

Some embodiments disclosed herein may enable assigning privacy ratings to tracking domains in order to increase user awareness of online privacy violations. In particular, some embodiments may receive a list of known tracking domains that load content on one or more host websites within a set of host websites. Raw data from the set of host websites may also be received. This raw data may include information relating to how each tracking domain on the list of known tracking domains behaves on each host website within the set of host websites. A prevalence, frequency, and role for each tracking domain may be determined from the raw data. The prevalence may be based on a number of host websites within the set of host websites that load content from each tracking domain. The frequency may be based on a percentage of host websites, within the number of host websites that load content from each tracking domain, on which each tracking domain performs a tracking activity. The role may be based on a type of tracking activity that each tracking domain performs on each host website within the set of host websites. Each tracking domain may be assigned to a prevalence cluster, a frequency cluster, and a role cluster. A rank may be determined for each prevalence cluster, frequency cluster, and role cluster. A domain privacy rating may be assigned to each tracking domain that is based on the ranks of the clusters to which each tracking domain is assigned. A privacy action may be performed based on the domain privacy rating assigned to each tracking domain.

In some embodiments, host websites may also be assigned to one of a specified number of website clusters based on the domain privacy ratings of the tracking domains that load content on each host website. A rank for each website cluster may be determined and a website privacy rating may be assigned to each host website within the set of host websites. A privacy action may be performed based on the website privacy rating assigned to each host website.

Turning to the figures, FIG. 1 illustrates an example system 100 configured for assigning privacy ratings to tracking domains in order to increase user awareness of online privacy violations. The system 100 may include a network 102, a user device 104 and associated user 105, a privacy server 106, host servers 108a-108n, and tracking servers 110a-110n.

In some embodiments, the network 102 may be configured to communicatively couple the user device 104, the privacy server 106, the host servers 108a-108n, and the tracking servers 110a-110n. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
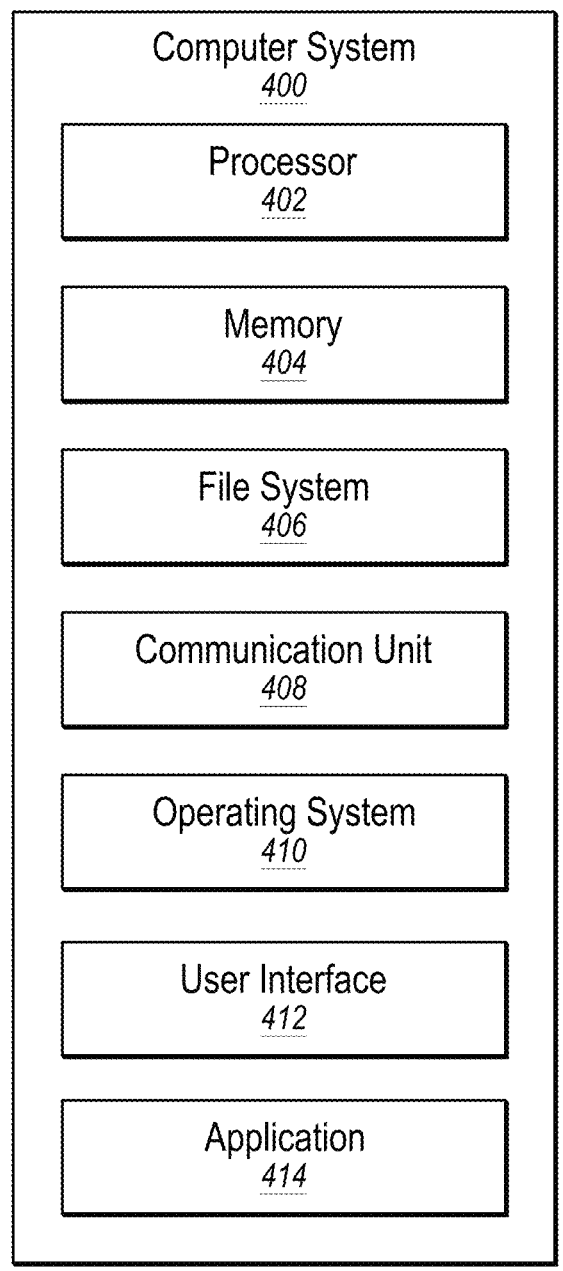
FIG. 4 illustrates an example computer system that may be employed in assigning privacy ratings to tracking domains in order to increase user awareness of online privacy violations.

In some embodiments, the user device 104 may be any computer system capable of communicating over the network 102 and vising one or more websites over network 102, examples of which are disclosed herein in connection with the computer system 400 of FIG. 4. In some embodiments, the user device 104 may include a web browser 112. The web browser 112 may enable the user 105 to access third-party content, such as websites, over the network 102. In some embodiments, the user device 104 may include one or more web applications 114. Like the web browser 112, the web application 114 may also enable the user 105 to access third-party content, such as websites, over the network 102.

In some embodiments, the user device 104 may include a database 116. The database 116 may include a list of known tracking domains. The known tracking domains may be identified by performing a large-scale crawling of websites that are available over the network 102. Websites analyzed in the large-scale crawling may include a specified number of the most visited websites or web pages on the Internet. For example, the top 1 million websites and their affiliated web pages on the Internet may be analyzed. Tracking domains that load content onto these web pages may be recognized based on identifier cookie creation and sharing behaviors exhibited by the tracking domains. Alternatively, a list of domains that have been previously identified as tracking domains may be received and stored in the database 116. In addition to the list of known tracking domains, the database 116 may also store raw data from a set of host websites that includes information relating to how each tracking domain on the list of known tracking domains behaves on each host website. This raw data may also be gathered by performing the large-scale crawling of websites over the network 102.

In some embodiments, the user device 104 may also include an enforcement application 118. The enforcement application 118 may be configured to determine privacy ratings for tracking domains and the host websites on which the tracking domains load content. The privacy ratings may correspond to how prolific the tracking domain is and how significant its privacy violations are. The enforcement application 118 may also determine and enforce an appropriate privacy action based on the privacy ratings of the tracking domains and the host websites on which the tracking domains load content. The enforcement application 118 could be configured in a variety of different ways. For example, the enforcement application 118 could be configured as an extension or a plugin or an addon to the web browser 112. The enforcement application 118 could also be configured as an extension or a plugin or an addon to the web application 114. Regardless of how the enforcement application 118 is configured, the enforcement application 118 may enforce one or more privacy actions on the websites that are accessed through either the web browser 112 and/or the web application 114. In one embodiment, these privacy actions are determined by the enforcement application 118. In other embodiments, the privacy actions are determined by the privacy server 106, which may send instructions to enforce these privacy actions to the enforcement application 118.

In some embodiments, the privacy server 106 may be any computer system capable of communicating over the network 102, examples of which are disclosed herein in connection with the computer system 400 of FIG. 4. In some embodiments, the privacy server 106 may include a database 120. Like the database 116, the database 120 may include a list of known tracking domains. The known tracking domains may be identified by performing a large-scale crawling of websites that are available over the network 102. Websites analyzed in the large-scale crawling may include a specified number of the most visited websites or web pages on the Internet. For example, the top 1 million websites and their affiliated web pages on the Internet may be analyzed. Tracking domains that load content onto these web pages may be recognized based on identifier cookie creation and sharing behaviors exhibited by the tracking domains. Alternatively, a list of domains that have been previously identified as tracking domains may be received and stored in the database 120. In addition to the list of known tracking domains, the database 120 may also store raw data that includes information relating to how each tracking domain on the list of known tracking domains behaves on the host websites. This raw data may also be gathered by performing the large-scale crawling of websites over the network 102.

In some embodiments, the privacy server 106 may also include a privacy application 122. Like the enforcement application 118, the privacy application 122 may be configured to determine privacy ratings for tracking domains and the host websites on which the tracking domains load content. The privacy ratings may correspond to how prolific the tracking domain is and how significant its privacy violations are. The privacy application 122 may also send instructions to the enforcement application 118 to enforce an appropriate privacy action based on the privacy ratings of tracking domains and the host websites on which the tracking domains load content.

In some embodiments, the host servers 108a-108n may be any computer systems capable of communicating over the network 102, examples of which are disclosed herein in connection with the computer system 400 of FIG. 4. In some embodiments, host servers 108a-108n may include host websites 124a-124n, which may include one or more host web pages 126a-126n. The host websites 124a-124n and host web pages 126a-126n may be accessed by the user 105 through the web browser 112 and/or the web application 114. The host websites 124a-124n may include content that is loaded from one or more tracking domains. This content may be loaded in one or more frames or in banners that appear at a top, bottom, or along the sides of the host web pages 126a-126n. Alternatively, the tracking domains may load content into the host websites 124a-124n by embedding the content directly within the web pages 126a-126n.

In some embodiments, the tracking servers 110a-110n may be any computer systems capable of communicating over the network 102, examples of which are disclosed herein in connection with the computer system 400 of FIG. 4. In some embodiments, tracking servers 110a-110n may include tracking domains 128a-128n. The tracking servers 110a-110n may load content into one or more host websites, such as websites 124a-124n, through the tracking domains 128a-128n. These tracking domains 128a-128n may perform a variety of tracking activities on the host websites 124a-124n.

The tracking activities of these tracking domains may be categorized into one of four main roles: (1) cookie creators, (2) intermediaries, (3) senders, and (4) receivers. Cookie creators may set cookies, either through a script (e.g., JavaScript) or through an HTTP header. Depending on the type of the cookie, cookie creators may be further differentiated as: (1) creators in a main website page, (2) third-party creators, and (3) ghost cookie creators. Intermediaries may not directly create or handle cookies, but may include resources which do. Intermediaries may be further differentiated as (1) intermediate creators and (2) intermediate sharers. A tracking domain may provide content to a host website that includes a script from another entity that performs a tracking activity. If the tracking activity is creating a cookie, the tracking domain would be an intermediate creator. Alternatively, if the tracking activity is sharing a cookie, the tracking domain would be an intermediate sharer. Senders may retrieve cookies set by others and explicitly send them over an HTTP request. The role of senders can be further broken down into three categories: (1) own senders, (2) in-chain senders, and (3) off-chain senders. Receivers may be tracking domains that explicitly receive cookies as part of an HTTP request. The role of receivers can be further broken down into three categories: (1) own receivers, (2) in-chain receivers, and (3) off-chain receivers.

These roles, and how to categorize the tracking activities of tracking domains into one of the four main roles, is described in U.S. patent application Ser. No. 17/191,454, the disclosure of which is hereby incorporated by reference in its entirety.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
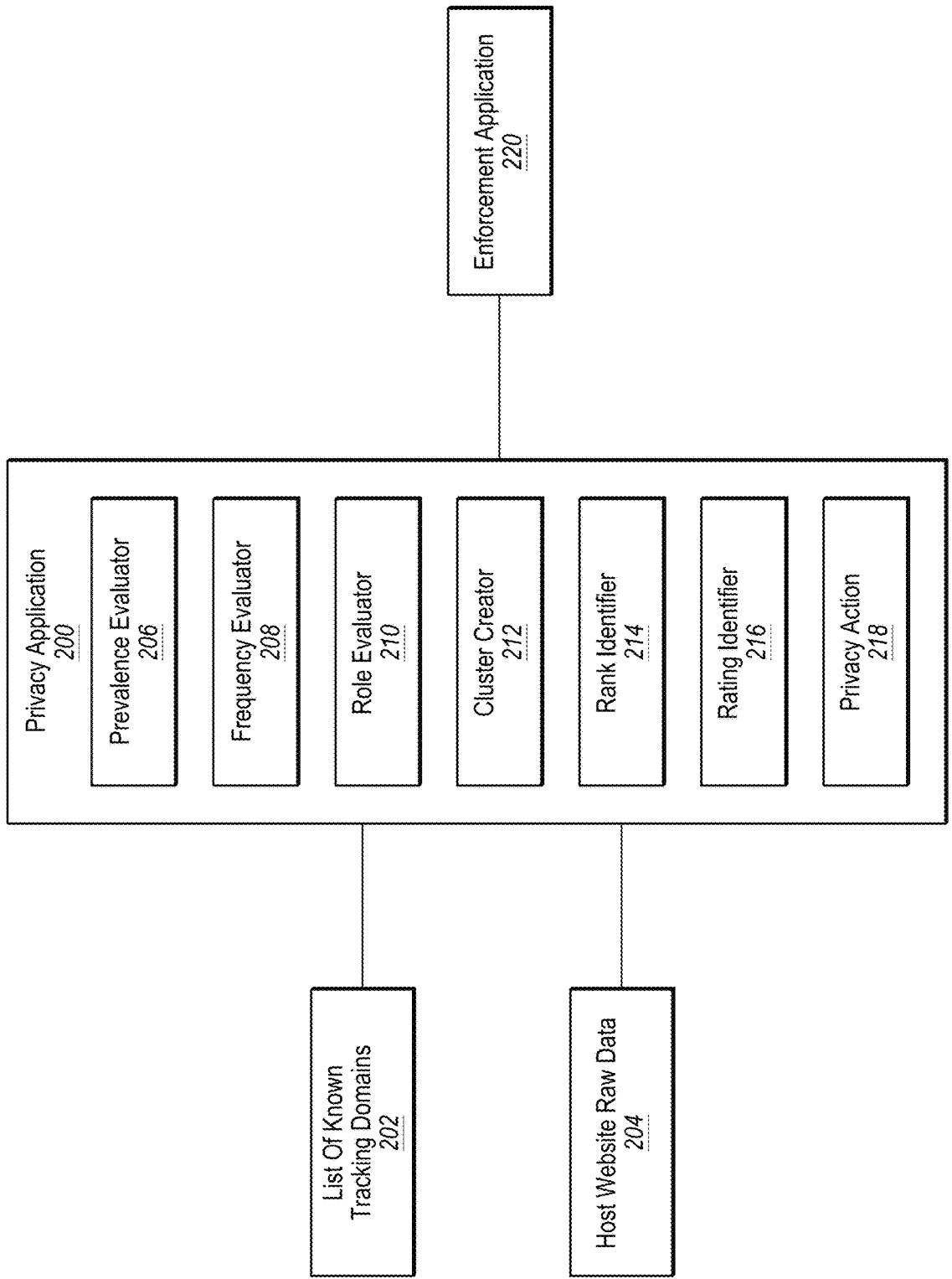
FIG. 2 illustrates an exemplary privacy application.
Figure 3A:
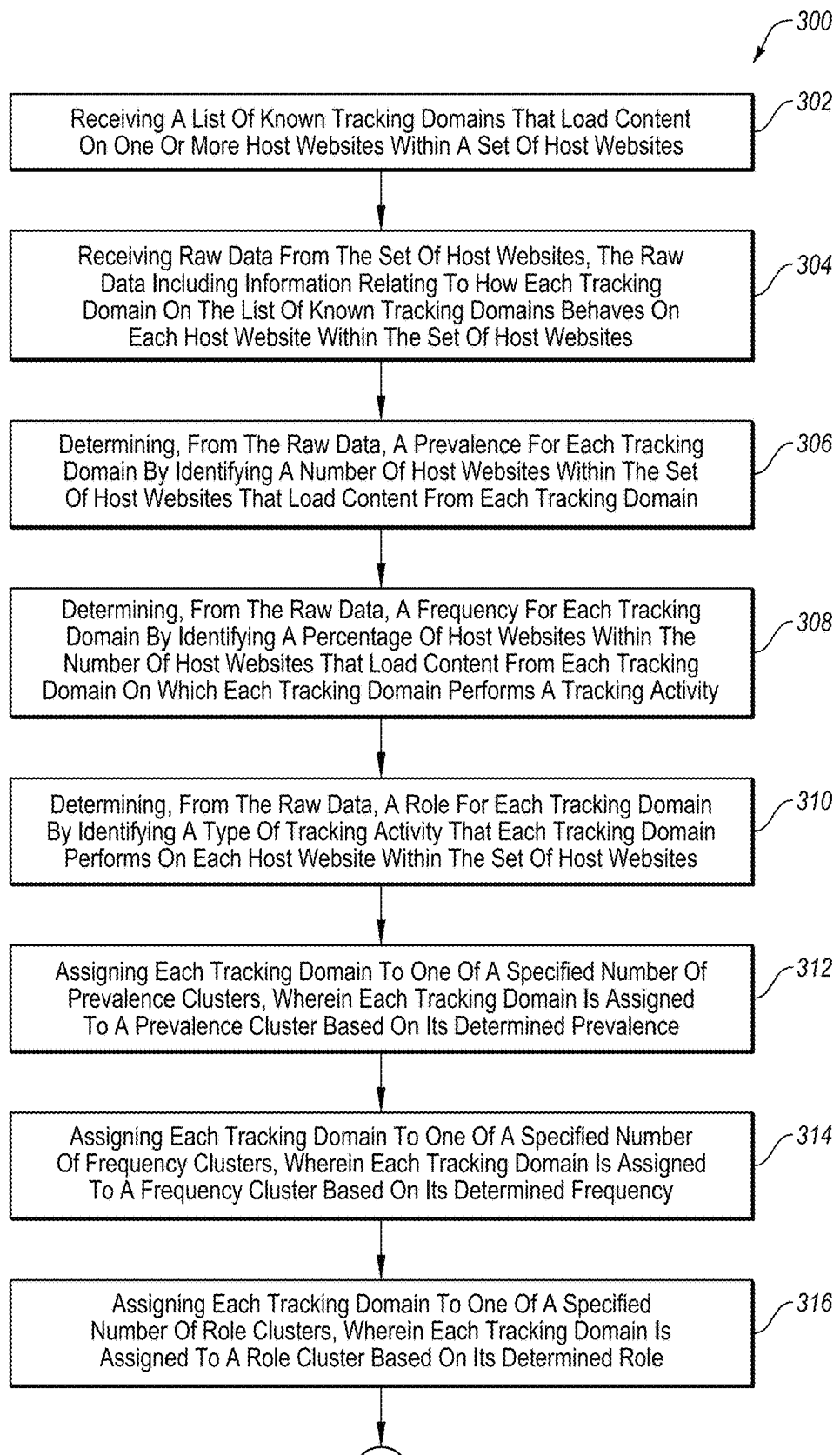
FIGS. 3A-3D is a flowchart of an example method for assigning privacy ratings to tracking domains in order to increase user awareness of online privacy violations.
Figure 3B:
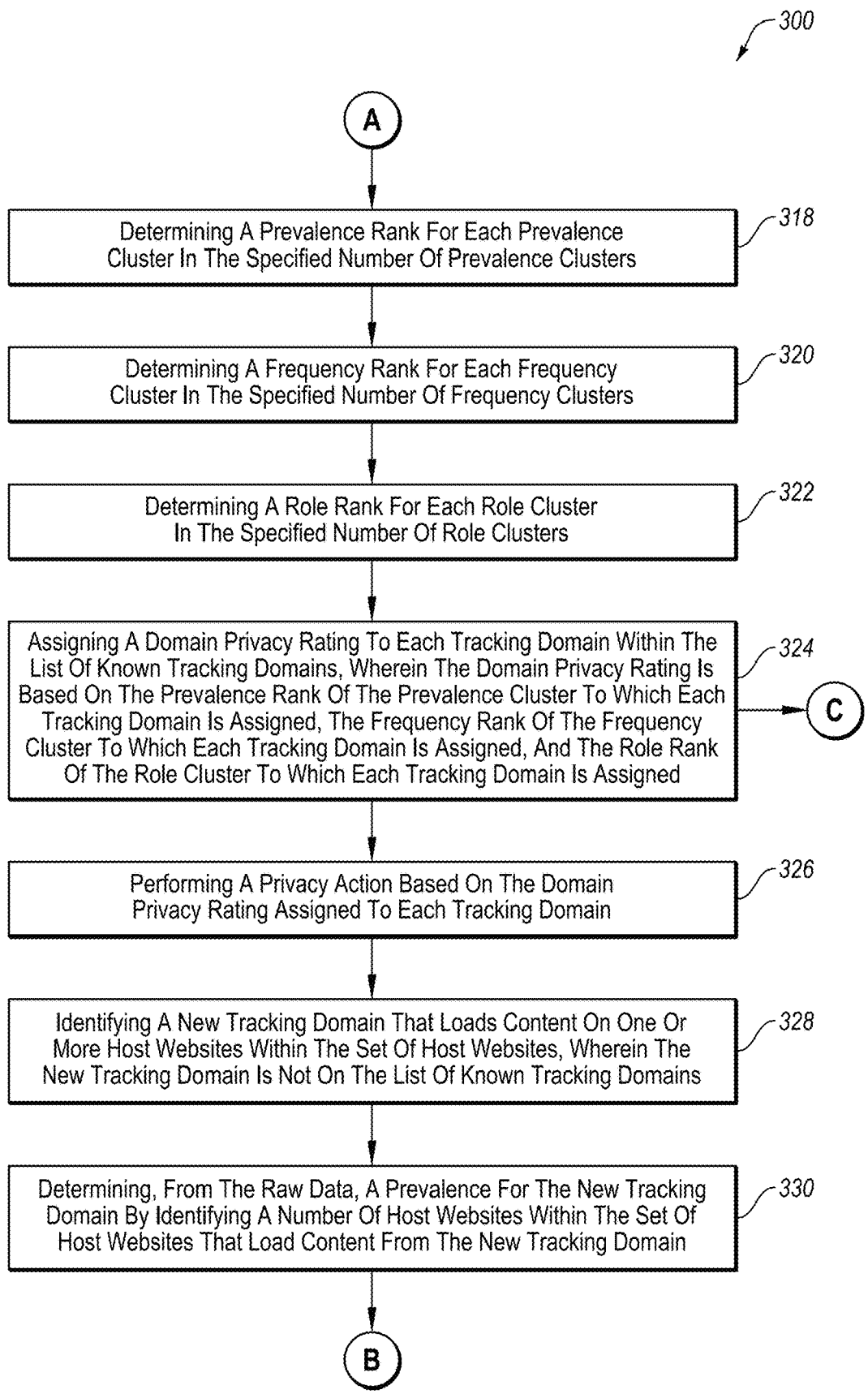
Figure 3C:
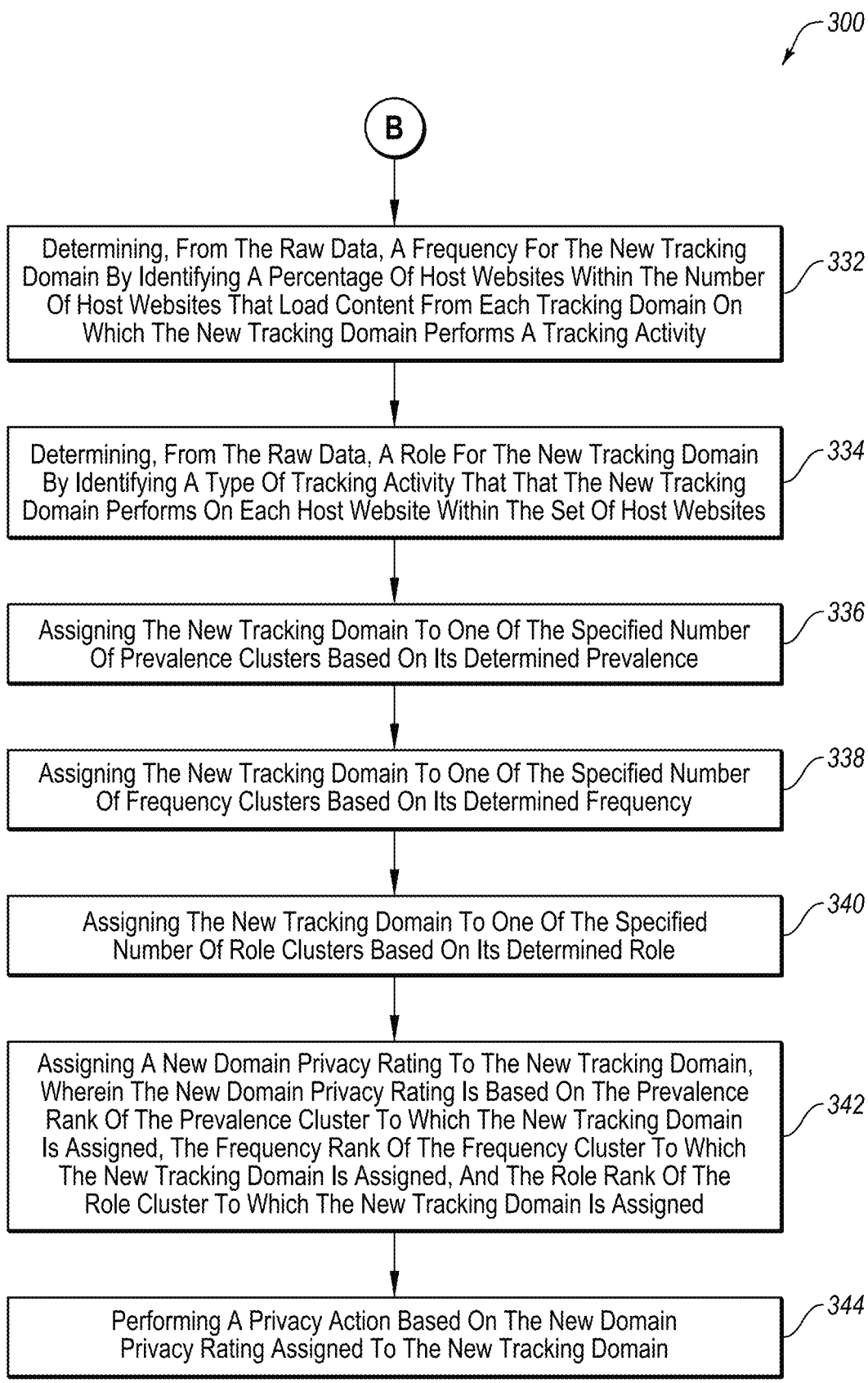
Figure 3D:
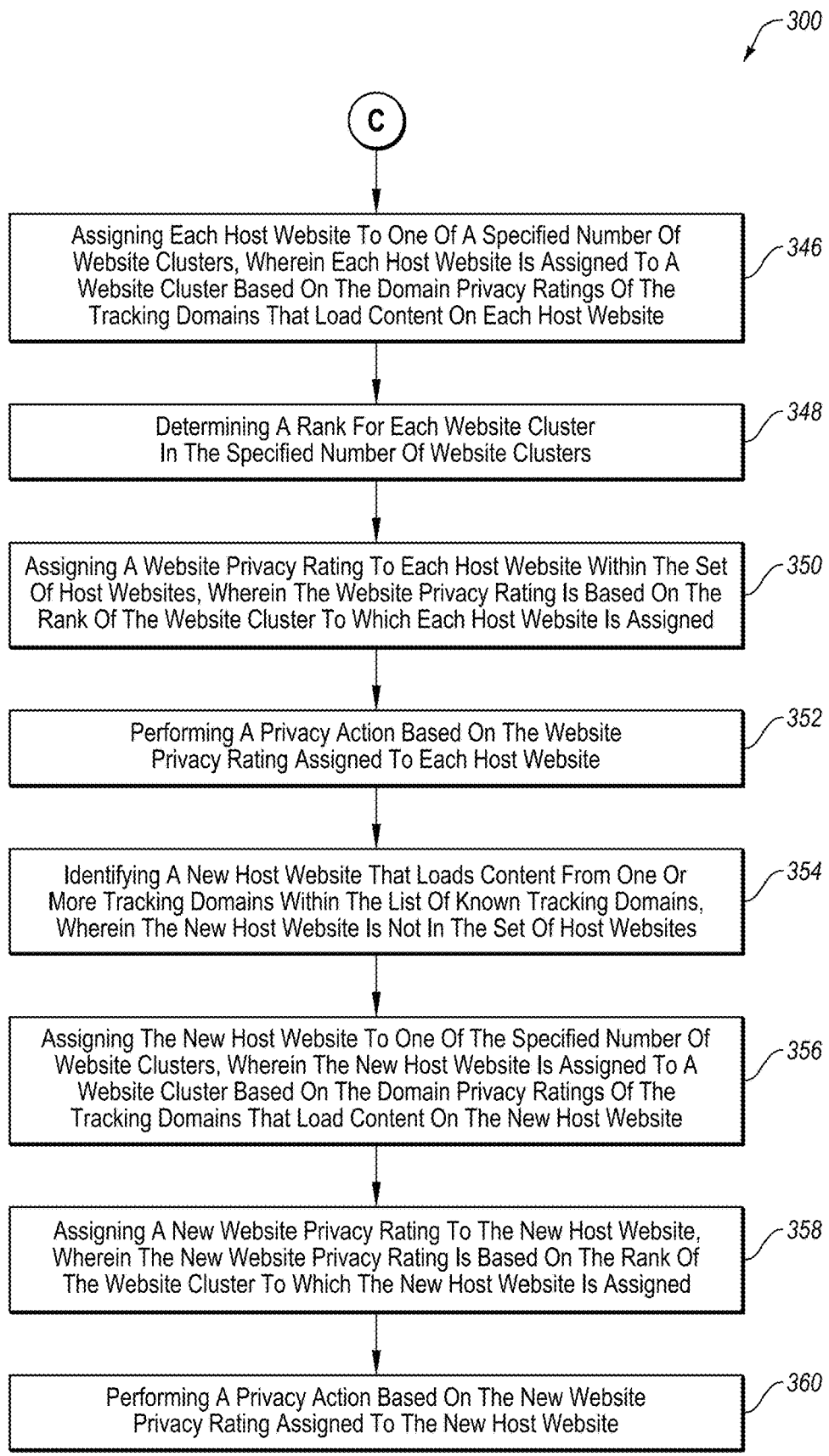

FIG. 2 illustrates an exemplary privacy application 200. As disclosed in FIG. 2, the privacy application 200 may receive a list of known tracking domains 202 and host website raw data 204. The list of known tracking domains 202 and the host website raw data 204 may be acquired through a large-scale crawling of a set of websites that are available over a network, such as the network 102. The set of websites may include, for example, some number of the most frequently visited websites on the Internet. For example, the top 1 million most frequency visited websites may be included in the crawling operation. This crawling operation may not only identify the tracking domains that load content into the websites included in the crawling operation, but may also download raw data from the host websites that includes information on how each tracking domain behaves on the host websites where the tracking domain loads content.

In one embodiment, the privacy application 200 may include a prevalence evaluator 206. The prevalence evaluator 206 may determine, from the raw data 204, a prevalence for each tracking domain within the list of tracking domains 202 by identifying a number of host websites included in the crawling operation that load content from each tracking domain. This number could be based on a total or a percentage. For example, if the crawling operation includes 1 million websites and a first tracking domain loads content into 500,000 of these websites, that tracking domain may have a prevalence of 50% or 500,000. If another tracking domain loads content into 200,000 of these websites, that tracking domain may have a prevalence of 20% or 200,000, and so on.

In one embodiment, the privacy application 200 may include a frequency evaluator 208. The frequency evaluator 208 may determine, from the raw data 204, a frequency for each tracking domain within the list of tracking domains 202 by identifying, within the host websites that load content from a tracking domain, a number of host websites on which each tracking domain performs a tracking activity. This number could be based on a total or a percentage. A tracking activity may include, for example, creating, sending, or receiving cookies. For example, if a first tracking domain loads content into 500,000 host websites and performs a tracking activity on 400,000 of these host websites, that tracking domain may have a frequency of 80% or 400,000. If another tracking domain loads content into 200,000 host websites and performs a tracking activity on 50,000 of these host websites, that tracking domain may have a prevalence of 25% or 50,000, and so on.

In one embodiment, the privacy application 200 may include a role evaluator 210. The role evaluator 210 may determine, from the raw data 204, a role for each tracking domain within the list of tracking domains 202 by identifying a type of tracking activity that each tracking domain performs on each host website included in the crawling operation. The type of tracking activity may be categorized into one of four main roles: (1) cookie creators, (2) intermediaries, (3) senders, and (4) receivers. How to determine and categorize the tracking activities of tracking domains into one of the four main roles is provided above.

In one embodiment, the privacy application 200 may include a cluster creator 212. To crate the clusters, the cluster creator 212 may use an algorithm that is based on a k-means method of vector quantization. The cluster creator 212 may assign each tracking domain into one of a specified number of prevalence clusters. This assignment may be based on the determined prevalence for each tracking domain. The cluster creator 212 may also assign each tracking domain into one of a specified number of frequency clusters. This assignment may be based on the determined frequency for each tracking domain. The cluster creator 212 may further assign each tracking domain into one of a specified number of role clusters. This assignment may be based on the determined role for each tracking domain.

The cluster creator 212 may be used to create any number of different clusters. In one embodiment, a clustering algorithm may be used to create 10 prevalence clusters, 10 frequency clusters, and 10 role clusters. In addition, the cluster creator 212 may identify a group of outliers within one or more of the prevalence, frequency, and role groups. The cluster creator 212 may place these outliers in a separate cluster before using a clustering algorithm to cluster the remaining tracking domains. For example, a median absolute deviation may be used to identify a group of prevalence outliers, which include tracking domains that load content into a high percentage of host websites relative to the other tracking domains. These prevalence outliers may be placed into a separate cluster before a clustering algorithm is used to cluster the remaining tracking domains.

In one embodiment, the privacy application 200 may include a rank identifier 214. The rank identifier 214 may assign a rank to each of the prevalence clusters, frequency clusters, and role clusters. The ranks determined by the rank identifier 214 may be numerical values that place each prevalence cluster into a sequence from a lowest privacy invasive prevalence cluster at one end to a highest privacy invasive prevalence cluster at an opposite end. The lowest privacy invasive prevalence cluster may be the cluster that contains the tracking domains that load content into the smallest number of host websites. The highest privacy invasive prevalence cluster may be the cluster that contains the tracking domains that load content into the largest number of host websites. To determine the prevalence rank, the rank identifier 214 may identify a centroid of each prevalence cluster and assign ranks based on the number (total or percentage) of host websites that load content from the tracking domains contained within the cluster.

Similarly, the ranks determined by the rank identifier 214 may be numerical values that place each frequency cluster into a sequence from a lowest privacy invasive frequency cluster at one end to a highest privacy invasive frequency cluster at an opposite end. The lowest privacy invasive frequency cluster may be the cluster that performs a tracking activity on the smallest number of host websites on which each tracking domain loads content. The highest privacy invasive frequency cluster may be the cluster that performs a tracking activity on the largest number of host websites on which each tracking domain loads content. To determine the frequency rank, the rank identifier 214 may identify a centroid of each frequency cluster and assign ranks based on the number (total or percentage) of host websites that load content from each tracking domain on which the tracking domains contained within the cluster perform a tracking activity.

The ranks determined by the rank identifier 214 may also be numerical values that place each role cluster into a sequence from a lowest privacy invasive role cluster at one end to a highest privacy invasive role cluster at an opposite end. To determine the role rank, the rank identifier 214 may identify a centroid of each role cluster. The type of tracking activity that each tracking domain performs on each host website at the centroid of each role cluster may be evaluated to determine the sequence of role clusters from the lowest privacy invasive role cluster to the highest privacy invasive role cluster. This evaluation may be performed by an algorithm or it may be performed manually by evaluating the types of tracking activities at the centroids of each cluster and determining which role is least and most invasive.

In one embodiment, the privacy application 200 may include a rating identifier 216. The rating identifier 216 may assign a domain privacy rating to each tracking domain. The domain privacy rating may be based on the prevalence rank of the prevalence cluster to which each tracking domain is assigned, the frequency rank of the frequency cluster to which each tracking domain is assigned, and the role rank of the role cluster to which each tracking domain is assigned. For example, in embodiments where the rank assigned to each cluster is a numerical value, the rating identifier 216 may simply sum the ranks of each cluster to which each tracking domain belongs in order to get the domain privacy ratings. For example, in one embodiment, a tracking domain may be assigned to a prevalence cluster that has a determined rank of 5, a frequency cluster that has a determined rank of 6, and a role cluster that has a determined rank of 4. This tracking domain may be assigned, by the rating identifier 216, a domain privacy rating of 15. In addition to numerical values, domain privacy ratings may be identified by colors or symbols. For example, domain privacy ratings may be red, yellow, or green where tracking domains that are the most invasive are assigned the red color, tracking domains that are the least invasive are assigned the green color, and tracking domains that fall somewhere in the middle are assigned a yellow color.

In one embodiment, the privacy application 200 may include a privacy action 218. The privacy action 218 may be determined based on the domain privacy rating assigned to each tracking domain. For example, the privacy action may include displaying on the host websites that load content from each tracking domain, the domain privacy rating for each tracking domain. The privacy action may also include blocking content loaded by external domains that have a domain privacy rating above a specified threshold. In one embodiment, a user may specify this threshold. The privacy action may also include performing an action to remove a tracking capability from a tracking domain based on its domain privacy rating. Thus, when a user visits a host website, he or she may be able to see the tracking domains that are loading content into the host website, and some visual depiction of the domain privacy rating assigned to each tracking domain. In some embodiments, based on their domain privacy rating, tracking domains may be blocked from loading content into a host webpage.

This privacy action 218 may be transmitted to an enforcement application 220 to enforce on a user device. For example, the enforcement application 220 may be implemented as the privacy application 122 in FIG. 1 and the privacy action 218 may be enforced on websites accessed through either the web browser 112 and/or the web application 114 by the enforcement application 118. In other embodiments, the enforcement application 220 may be implemented as part of the enforcement application 118 in FIG. 1.

In some embodiments, once all tracking domains in the list of known tracking domains 202 have been assigned a domain privacy rating by the rating identifier 216, the cluster creator 212 may assign each host website to one of a specified number of website clusters. This assignment may be based on a combined domain privacy rating of the tracking domains that load content on each individual host website. For example, if a website hosts content from 5 different tracking domains, and each of these tracking domains have a domain privacy rating of 10, the website may have a combined domain privacy rating of 50.

In addition, the rank identifier 214 may determine a rank for each website cluster in the specified number of website clusters. This rank may be a numerical value that places each website cluster into a sequence from a lowest privacy invasive website cluster at one end to a highest privacy invasive website cluster at an opposite end. The lowest privacy invasive website cluster may be the cluster that has the smallest combined domain privacy rating of the tracking domains that load content onto each host website. The highest privacy invasive website cluster may be the cluster that has the highest combined domain privacy rating of the tracking domains that load content onto each host website. To determine the rank, the rank identifier 214 may identify a centroid of each website cluster and assign ranks based on the combined domain privacy rating of the tracking domains that load content onto each host website. The website privacy rating may be a color, number, symbol, or some other visual mechanism to inform a user of a website's privacy rating. In some embodiments, the rank of the website cluster to which each host website is assigned may be the same as its website privacy rating.

Finally, another privacy action 218 may be determined based on the website privacy rating assigned to each host website. For example, the privacy action may include displaying on each host websites its website privacy rating. Thus, when a user visits a host website, he or she will be able to see some visual depiction of the website privacy rating assigned to the host website. The privacy action may also include blocking host websites that have a website privacy rating above a specified threshold. In one embodiment, a user may specify this threshold. This privacy action 218 may be transmitted to an enforcement application 220 to enforce on a user device. For example, the enforcement application 220 may be implemented as the privacy application 122 in FIG. 1 and the privacy action 218 may be enforced on websites accessed through either the web browser 112 and/or the web application 114 by the enforcement application 118. In other embodiments, the enforcement application 220 may be implemented as part of the enforcement application 118 in FIG. 1.

Modifications, additions, or omissions may be made to the privacy application 200 without departing from the scope of the present disclosure. For example, the privacy application 200 may include additional components similar to the components illustrated in FIG. 2 that each may be configured similarly to the components illustrated in FIG. 2. Further, in some embodiments, the functionality of the privacy application 200 may be spread across two or more separate privacy applications.

FIGS. 3A-3D is a flowchart of an example method 300 for assigning privacy ratings to tracking domains in order to increase user awareness of online privacy violations. The method 300 may be performed, in some embodiments, by a device or system, such as by the enforcement application 118 or the privacy application 122 of FIG. 1 or the privacy application 200 of FIG. 2. In these and other embodiments, the method 300 may be performed by one or more processors based on one or more computer-readable instructions stored on one or more non-transitory computer-readable media. The method 300 will now be described in connection with FIGS. 1, 2, and 3A-3D.

The method 300 may include, at action 302, receiving a list of known tracking domains that load content on one or more host websites within a set of host websites. The method 300 may include, at action 304, receiving raw data from the set of host websites, the raw data including information relating to how each tracking domain on the list of known tracking domains behaves on each host website within the set of host websites. The list of known tracking domains and the raw data may be acquired through a large-scale crawling of a set of websites that are available over a network, such as the network 102 of FIG. 1. The set of websites may include, for example, some number of the most frequently visited websites on the Internet. This crawling operation may not only identify the tracking domains that load content into the websites included in the crawling operation, but may also download raw data from the host websites that includes information on how each tracking domain behaves on the host websites where the tracking domains load content.

The method 300 may include, at action 306, determining, from the raw data, a prevalence for each tracking domain by identifying a number of host websites within the set of host websites that load content from each tracking domain. This number could be based on a total or a percentage. For example, if the crawling operation includes 1 million websites and a first tracking domain loads content into 500,000 of these websites, that tracking domain may have a prevalence of 50% or 500,000. If another tracking domain loads content into 200,000 of these websites, that tracking domain may have a prevalence of 20% or 200,000, and so on.

The method 300 may include, at action 308, determining, from the raw data, a frequency for each tracking domain by identifying a percentage of host websites, within the number of host websites that load content from each tracking domain, on which each tracking domain performs a tracking activity. This number could be based on a total or a percentage. A tracking activity may include, for example, creating, sending, or receiving cookies. For example, if a first tracking domain loads content into 500,000 host websites and performs a tracking activity on 400,000 of these host websites, that tracking domain may have a frequency of 80% or 400,000. If another tracking domain loads content into 200,000 host websites and performs a tracking activity on 50,000 of these host websites, that tracking domain may have a prevalence of 25% or 50,000, and so on.

The method 300 may include, at action 310, determining, from the raw data, a role for each tracking domain by identifying a type of tracking activity that each tracking domain performs on each host website within the set of host websites. The type of tracking activity may be categorized into one of four main roles: (1) cookie creators, (2) intermediaries, (3) senders, and (4) receivers. How to determine and categorize the tracking activities of tracking domains into one of the four main roles is provided above.

The method 300 may include, at action 312, assigning each tracking domain to one of a specified number of prevalence clusters, wherein each tracking domain is assigned to a prevalence cluster based on its determined prevalence. The method 300 may include, at action 314, assigning each tracking domain to one of a specified number of frequency clusters, wherein each tracking domain is assigned to a frequency cluster based on its determined frequency. The method 300 may include, at action 316, assigning each tracking domain to one of a specified number of role clusters, wherein each tracking domain is assigned to a role cluster based on its determined role.

For example, the cluster creator 212 may assign each tracking domain to one of a specified number of prevalence clusters, frequency clusters, and role clusters by applying a clustering algorithm, such as a k-means method of vector quantization. Any number of different prevalence, frequency, and role clusters may be created. In one embodiment, 10 prevalence clusters, 10 frequency clusters, and 10 role clusters may be created. In addition, groups of outliers may be identified and placed in a separate cluster before using a clustering algorithm to cluster the remaining tracking domains. In one embodiment, a median absolute deviation may be used to identify these outliers.

The method 300 may include, at action 318, determining a prevalence rank for each prevalence cluster in the specified number of prevalence clusters. The method 300 may include, at action 320, determining a frequency rank for each frequency cluster in the specified number of frequency clusters. The method 300 may include, at action 322 determining a role rank for each role cluster in the specified number of role clusters.

For example, the rank identifier 214 may determine a rank for each of the specified number of prevalence clusters, frequency clusters, and role clusters by identifying and evaluating a centroid of each prevalence, frequency, and role cluster. The ranks assigned may correspond to how prolific the tracking domain is and how significant its privacy violations are. For example, the ranks identified may be numerical values that place each prevalence, frequency, and role cluster into a sequence from lowest privacy invasive clusters at one end to highest privacy invasive clusters at an opposite end.

With regard to the prevalence clusters, the lowest privacy invasive cluster may be the cluster that contains the tracking domains that load content into the smallest number (total or percentage) of host websites. The highest privacy invasive prevalence cluster may be the cluster that contains the tracking domains that load content into the largest number (total or percentage) of host websites.

With regard to the frequency clusters, the lowest privacy invasive cluster may be the cluster that perform a tracking activity on the smallest number (total or percentage) of host websites on which each tracking domain performs a tracking activity from the group of host websites load content from each tracking domain. The highest privacy invasive frequency cluster may be the cluster that performs a tracking activity on the largest number (total or percentage) of host websites on which each tracking domain performs a tracking activity from the group of host websites load content from each tracking domain.

With regard to the role clusters, the lowest privacy invasive role cluster may be the cluster that performs the least privacy invasive tracking activity and the highest privacy invasive role cluster may be the cluster that performs the highest privacy invasive tracking activity. The type of tracking activity may be categorized into one of four main roles: (1) cookie creators, (2) intermediaries, (3) senders, and (4) receivers. How to determine and categorize the tracking activities of tracking domains into one of the four main roles is provided above. An algorithm may be used or a manual evaluation may be performed to determine which roles are least and most invasive.

The method 300 may include, at action 324, assigning a domain privacy rating to each tracking domain within the list of known tracking domains, wherein the domain privacy rating is based on the prevalence rank of the prevalence cluster to which each tracking domain is assigned, the frequency rank of the frequency cluster to which each tracking domain is assigned, and the role rank of the role cluster to which each tracking domain is assigned. For example, the rating identifier 216 may assign these domain privacy ratings. In embodiments where the rank assigned to each cluster is a numerical value, the domain privacy ratings may be a sum of the ranks of each cluster to which each tracking domain belongs. For example, in one embodiment, a tracking domain may be assigned to a prevalence cluster that has a determined rank of 5, a frequency cluster that has a determined rank of 6, and a role cluster that has a determined rank of 4. This tracking domain may be assigned a domain privacy rating of 15. In addition to numerical values, domain privacy ratings may be identified by colors or symbols. For example, domain privacy ratings may be red, yellow, or green where tracking domains that are the most invasive are assigned the red color, tracking domains that are the least invasive are assigned the green color, and tracking domains that fall somewhere in the middle are assigned a yellow color.

The method 300 may include, at action 326, performing a privacy action based on the domain privacy rating assigned to each tracking domain. For example, the privacy action may include displaying on the host websites that load content from each tracking domain, the domain privacy rating for each tracking domain. The privacy action may also include blocking content loaded by external domains that have a domain privacy rating above a specified threshold. In one embodiment, a user may specify this threshold. The privacy action may also include performing an action to remove a tracking capability from a tracking domain based on its domain privacy rating.

The method 300 may include, at action 328, identifying a new tracking domain that loads content on one or more host websites within the set of host websites, wherein the new tracking domain is not on the list of known tracking domains. While the new tracking domain may not be included in the list of known tracking domains, it may load content into the host websites from which the raw data has been obtained.

The method 300 may include, at action 330, determining, from the raw data, a prevalence for the new tracking domain by identifying a number of host websites within the set of host websites that load content from the new tracking domain. The method 300 may include, at action 332, determining, from the raw data, a frequency for the new tracking domain by identifying a percentage of host websites within the number of host websites that load content from each tracking domain on which the new tracking domain performs a tracking activity. The method 300 may include, at action 334, determining, from the raw data, a role for the new tracking domain by identifying a type of tracking activity that that the new tracking domain performs on each host website within the set of host websites. Actions 330, 332, and 334 may be performed by the prevalence evaluator 206, the frequency evaluator 208, and the role evaluator 210 in the manner provided above in connection with actions 306, 308, and 310, respectively.

The method 300 may include, at action 336, assigning the new tracking domain to one of the specified number of prevalence clusters based on its determined prevalence. The method 300 may include, at action 338, assigning the new tracking domain to one of the specified number of frequency clusters based on its determined frequency. The method 300 may include, at action 340, assigning the new tracking domain to one of the specified number of role clusters based on its determined role. Actions 336, 338, and 340 may be performed by the cluster creator 212 in the manner provided above in connection with actions 312, 314, and 316, respectively.

The method 300 may include, at action 342, assigning a new domain privacy rating to the new tracking domain, wherein the new domain privacy rating is based on the prevalence rank of the prevalence cluster to which the new tracking domain is assigned, the frequency rank of the frequency cluster to which the new tracking domain is assigned, and the role rank of the role cluster to which the new tracking domain is assigned. Action 342 may be performed by the rating identifier 216 in the manner provided above in connection with action 324.

Finally, the method 300 may include, at action 344, performing a privacy action based on the new domain privacy rating assigned to the new tracking domain. Action 342 may be performed in the manner provided above in connection with action 326. For example, the privacy action may include displaying on each host website its website privacy rating. Thus, when a user visits a host website, he or she will be able to see some visual depiction of the website privacy rating assigned to the host website. The privacy action may also include blocking host websites that have a website privacy rating above a specified threshold. In one embodiment, a user may specify this threshold.

In some embodiments, the method 300 may also include actions 346 to 360. These actions may be performed in parallel with other actions of method 300. For example, in one embodiment, actions 346 to 360 may initiate upon the completion of action 324. In other embodiments, actions 346 to 360 may initiate upon the completion of action 326.

The method 300 may include, at action 346, assigning each host website to one of a specified number of website clusters, wherein each host website is assigned to a website cluster based on the domain privacy ratings of the tracking domains that load content on each host website. The cluster creator 212 may create these clusters based on a combination of the domain privacy ratings of the tracking domains that load content into each individual host website. For example, in some embodiments, where the domain privacy ratings are numerical, the domain privacy ratings of the tracking domains that load content into each individual host website may be aggregated. The host websites may then be assigned into website clusters based on the aggregated score of the external domains that load content into each host website.

The method 300 may include, at action 348, determining a rank for each website cluster in the specified number of website clusters. The rank identifier 214 may determine a rank for each of the specified number of website clusters by identifying and evaluating a centroid of each website cluster. For example, the ranks identified may be numerical values that place each website cluster into a sequence from a lowest privacy invasive website cluster at one end to a highest privacy invasive website cluster at an opposite end. The lowest privacy invasive website cluster may be the cluster that contains the host websites having the lowest combination of domain privacy ratings of tracking domains from which content is loaded. The highest privacy invasive website cluster may be the cluster that contains the host websites having the highest combination of domain privacy ratings of tracking domains from which content is loaded.

The method 300 may include, at action 350, assigning a website privacy rating to each host website within the set of host websites, wherein the website privacy rating is based on the rank of the website cluster to which each host website is assigned. For example, the rating identifier 216 may assign these website privacy ratings. The website privacy rating may be a color, number, symbol, or some other visual mechanism to inform a user of a website's privacy rating. In some embodiments, the rank of the website cluster to which each host website is assigned may be the same as its website privacy rating.

The method 300 may include, at action 352, performing a privacy action based on the website privacy rating assigned to each host website. For example, the privacy action may include displaying on each host websites its website privacy rating. Thus, when a user visits a host website, he or she will be able to see some visual depiction of the website privacy rating assigned to the host website. The privacy action may also include blocking host websites that have a website privacy rating above a specified threshold. In one embodiment, a user may specify this threshold.

The method 300 may include, at action 354, identifying a new host website that loads content from one or more tracking domains within the list of known tracking domains, wherein the new host website is not in the set of host websites. The method 300 may include, at action 356, assigning the new host website to one of the specified number of website clusters, wherein the new host website is assigned to a website cluster based on the domain privacy ratings of the tracking domains that load content on the new host website. Action 356 may be performed by the cluster creator 212 in the manner provided above in connection with action 346.

The method 300 may include, at action 358, assigning a new website privacy rating to the new host website, wherein the new website privacy rating is based on the rank of the website cluster to which the new host website is assigned. Action 358 may be performed by the rating identifier 216 in the manner provided above in connection with action 350. The method 300 may include, at action 360, performing a privacy action based on the new website privacy rating assigned to the new host website. Action 360 may be performed in the manner provided above in connection with action 352.

The method 300 may thus be employed, in some embodiments, to assign privacy ratings to tracking domains in order to increase user awareness of online privacy violations. The privacy ratings assigned to tracking domains may also be used to assign privacy ratings to the websites that host content from these tracking domains. Once identified, these privacy ratings may be communicated to a user through the host websites so that the user is aware of the privacy violations that may occur by visiting a host website.

Although the actions of the method 300 are illustrated in FIGS. 3A-3D as discrete actions, various actions may be divided into additional actions, combined into fewer actions, reordered, expanded, or eliminated, depending on the desired implementation. For example, in some embodiments, a domain privacy rating need not be based on a prevalence, frequency, and role. In some embodiments, a domain privacy rating may be determined based just one or two of these. For example, in some embodiments a domain privacy rating may be based on a prevalence and frequency, or a prevalence and role, or a frequency and role. Alternatively, a domain privacy rating may be based on prevalence alone, or frequency alone, or role alone.

Further, it is understood that the method 300 may improve the functioning of a computer system itself. For example, the functioning of the user device 104 of FIG. 1 may itself be improved by the method 300. For example, by performing a security action that increases a user's awareness of privacy violations by tracking domains on host websites, the user 105 may avoid these websites and the tracking domains that load content into these websites. By avoiding these websites and tracking domains, the privacy violations that consume computing resources will be avoided. In addition, in embodiments where content and/or websites are blocked, these privacy violations will also be prevented thus eliminating computing resources that would otherwise be consumed.

Also, the method 300 may improve the technical field of online privacy awareness. By providing some visual indication of the tracking domains that perform tracking activities through content loaded on host websites, users that visit these host websites can recognize quickly not only what domains and websites are performing tracking activities, but also how significant these tracking activities are. Users may then make informed decisions on what websites to visit and whether to block certain content based on the tracking activities performed.

FIG. 4 illustrates an example computer system that may be employed in assigning privacy ratings to tracking domains in order to increase user awareness of online privacy violations. In some embodiments, the computer system 400 may be part of any of the systems or devices described in this disclosure. For example, the computer system 400 may be part of any of the user device 104, the privacy server 106, the host servers 108a-108n, or the tracking servers 110a-110n of FIG. 1 and the privacy application 200 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the enforcement application 118 and privacy application 122 of FIG. 1, the privacy application 200 of FIG. 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the enforcement application 118, privacy application 122 of FIG. 1, and the privacy application 200 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for assigning privacy ratings to tracking domains in order to increase user awareness of online privacy violations, the computer-implemented method comprising:
    identifying a number of known tracking domains that load content on one or more host websites within a set of host websites;

receiving raw data from the set of host websites, the raw data including information relating the known tracking domains that load content on the one or more host websites;

determining, from the raw data, a characteristic of each known tracking domain;

assigning each known tracking domain to at least one cluster within a number of clusters based on the characteristic determined for each known tracking domain such that tracking domains with similar characteristics are assigned to a same cluster;

determining a rank for each cluster within the number of clusters;

assigning a domain privacy rating to each known tracking domain within the identified number of known tracking domains, wherein the domain privacy rating is based on the rank of the at least one cluster to which each known tracking domain is assigned;

identifying a new tracking domain that loads content on one or more host websites within the set of host websites, wherein the new tracking domain is not within the identified number of known tracking domains;

determining, from the raw data, a characteristic of the new tracking domain;

assigning the new tracking domain to a cluster based on the characteristic determined for the new tracking domain;

assigning a new domain privacy rating to the new tracking domain, wherein the new domain privacy rating is based on a rank of the cluster to which the new tracking domain is assigned; and performing a privacy action based on the new domain privacy rating assigned to the new tracking domain.

2. The method of claim 1, wherein the characteristic determined for each known tracking domain is a prevalence that is determined by identifying a number of host websites within the set of host websites that load content from each known tracking domain.

3. The method of claim 1, wherein the characteristic of each known tracking domain is a frequency that is determined by identifying a percentage of host websites on which each known tracking domain performs a tracking activity.

4. The method of claim 1, wherein the characteristic determined for each known tracking domain is a role that is determined by identifying a type of tracking activity that each known tracking domain performs on the one or more host websites.

5. The method of claim 1, wherein the characteristic determined for each known tracking domain includes (a) a prevalence that is determined by identifying a number of host websites within the set of host websites that load content from each known tracking domain and (b) a frequency that is determined by identifying a percentage of host websites on which each known tracking domain performs a tracking activity.

6. The method of claim 5, wherein the at least one cluster to which each known tracking domain is assigned is based on the prevalence and frequency determined for each known tracking domain.

7. The method of claim 5, wherein:
each known tracking domain is assigned to a first cluster based on the determined prevalence,
each known tracking domain is assigned to a second cluster based on the determined frequency, and
the domain privacy rating assigned to each known tracking domain is based the first and second clusters to which each known tracking domain is assigned.

8. The method of claim 1, wherein the characteristic determined for each known tracking domain includes (a) a prevalence that is determined by identifying a number of host websites within the set of host websites that load content from each known tracking domain and (b) a role that is determined by identifying a type of tracking activity that each known tracking domain performs on the one or more host websites.

9. The method of claim 8, wherein the at least one cluster to which each known tracking domain is assigned is based on the prevalence and role determined for each known tracking domain.

10. The method of claim 8, wherein:
each known tracking domain is assigned to a first cluster based on the determined prevalence,
each known tracking domain is assigned to a second cluster based on the determined role, and
the domain privacy rating assigned to each known tracking domain is based the first and second clusters to which each known tracking domain is assigned.

11. The method of claim 1, wherein the characteristic determined for each known tracking domain includes (a) a frequency that is determined by identifying a percentage of host websites on which each known tracking domain performs a tracking activity and (b) a role that is determined by identifying a type of tracking activity that each known tracking domain performs on the one or more host websites.

12. The method of claim 11, wherein the at least one cluster to which each known tracking domain is assigned is based on the frequency and role determined for each known tracking domain.

13. The method of claim 11, wherein:
each known tracking domain is assigned to a first cluster based on the determined frequency,
each known tracking domain is assigned to a second cluster based on the determined role, and
the domain privacy rating assigned to each known tracking domain is based the first and second clusters to which each known tracking domain is assigned.

14. The method of claim 1, wherein the privacy action is blocking content loaded by the new tracking domains.

15. The method of claim 1, wherein the raw data is generated by performing a crawling operation on a number of most commonly visited websites.

16. The method of claim 1, wherein the privacy action is displaying, on the one or more host websites that load content from the new tracking domain, the new domain privacy rating for the new tracking domain.

17. The method of claim 16, wherein the domain privacy rating is represented by a numerical value or a color.

* * * * *